S. C. STREET & P. W. SIRETT.
DEMOUNTABLE WHEEL.
APPLICATION FILED OCT. 18, 1917.
1,260,249.
Patented Mar. 19, 1918.
2 SHEETS—SHEET 2.
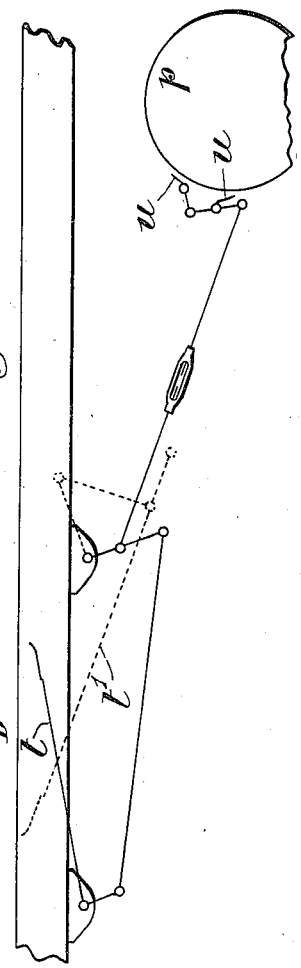
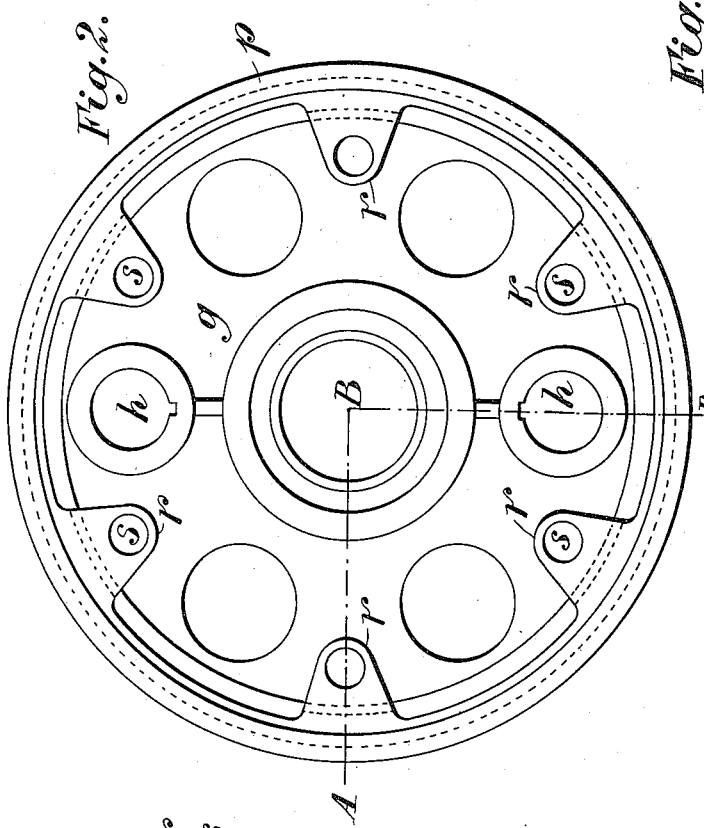
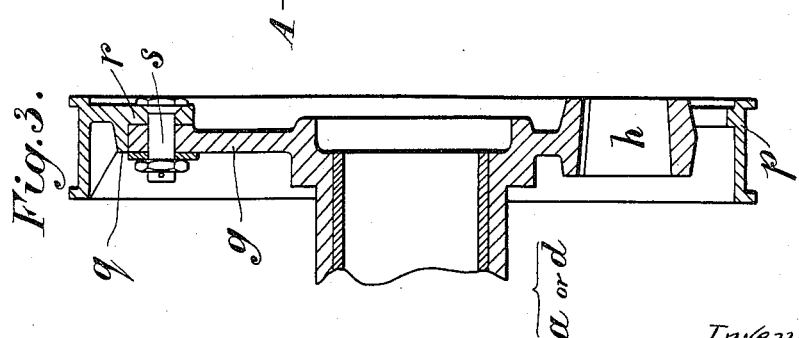
Inventors
Samuel Collage Street & Percy William Sirett
per
H C Heide
Attorney

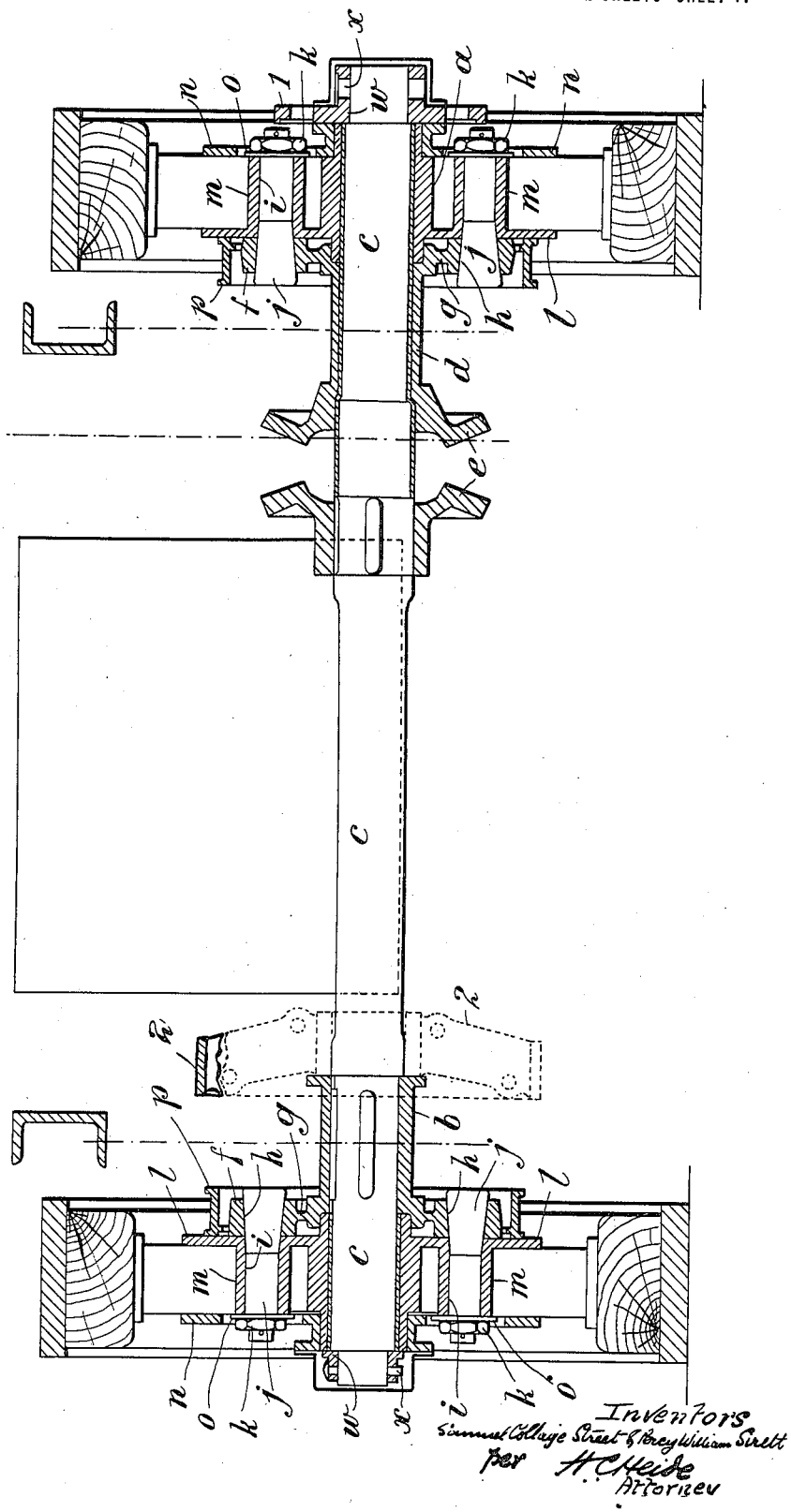

UNITED STATES PATENT OFFICE.

SAMUEL COLLAGE STREET AND PERCY WILLIAM SIRETT, OF NORTHAMPTON, ENGLAND, ASSIGNORS OF ONE-HALF TO WILLIAM ALLCHIN, LIMITED, OF NORTHAMPTON, ENGLAND.

DEMOUNTABLE WHEEL.

1,260,249. Specification of Letters Patent. Patented Mar. 19, 1918.

Application filed October 18, 1917. Serial No. 197,244.

*To all whom it may concern:*

Be it known that we, SAMUEL COLLAGE STREET and PERCY WILLIAM SIRETT, subjects of His Majesty King George V of the United Kingdom of Great Britain and Ireland and of the British Dominions Beyond the Sea and Emperor of India, residing at Northampton, England, have invented certain new and useful Improvements in Demountable Wheels, of which the following is a specification.

The present invention relates to demountable wheels for automobile and other vehicles and the interchanging and braking thereof, and the invention being particularly applicable to steam-wagons and the like it will be hereinafter described in that application.

In detachable and interchangeable wheel systems it is a known expedient to demountably connect a wheel on its axle by multiple small screw bolts which pass through the boss of the wheel and the flange of an axle sleeve serving as a permanent hub on the one hand or as a differential sleeve on the other.

An object of the present invention is to so connect a wheel for drive of rotation from the corresponding axle or from the corresponding sleeve of the compensating gear by a cross pin drive, the axes of whose members run parallel with the wheel axis, and with wedge action re-acting on both parts to be joined that a few large bolts will serve, no more than two working well, also that an effective countering of that tendency to distort and unfigure the pins and the walls of their co-acting holes or passages to set up lost motion with consequent striking and hammering action shall be made possible. And simultaneously with doing this better facilities are given for removing and replacing a wheel, these facilities *inter alia* allowing any wheel according to the system of the present invention to be interchanged with any other wheel according to the same system provided only that the wheels are true to the same standard.

Another object of the present invention is to integrate as a compact stable combination a detachable wheel and braking system in which the combination is of the character of an integral unit for the purpose of braking an abreast pair of wheels simultaneously irrespective of whether the drive of rotation is from the axle itself on the one hand, or from the sleeve of the compensating gear on the other hand, but in which, notwithstanding this integral characteristic, no hindrance whatsoever to the removal or replacement of the wheel is involved by the presence of the braking system, that is to say, so far as any removal or replacement only of either of the wheels is concerned, the braking system in no wise interferes therewith; neither is it itself interfered with thereby.

The invention is illustrated in the accompanying drawings, in which:—

Figure 1 is a vertical section of the driving wheels of a steam motor wagon.

Fig. 2 is a face view of a flanged sleeve with braking drums.

Fig. 3 is a section taken as to the top half on A B of Fig. 2 and as to the lower half on B D of Fig. 2.

Fig. 4 is a diagram of a braking system found to work well.

The illustrated form of the present invention comprises a detachable wheel system in which the wheel hub $a$ is brought end-on with a sleeve $b$ rotatable with the axle $c$, or end-on with a sleeve $d$ loose on the axle $c$ but integral with the compensating gear $e$, and radial portions $f$ of a continuous or interrupted flange $g$ of the sleeve $b$ are provided with holes $h$ which shall register with other holes $i$ in the wheel set around the wheel hub to allow the passage of non-rotatable securing and driving pins or bolts $j$, these being screw nutted from their outer ends and formed so as when the nuts are tightened, to produce a reaction of the bearing surfaces, whether wholly or in part, tending to bring such bearing surfaces firmly together while simultaneously drawing the wheel hub firmly to the corresponding flanged sleeve $b$.

As conducing to a more favorable distribution of wear and to a greater simplification of the removal and replacement operation, preference is had to a small number of driving pins *j* having a corresponding increased bearing surface; in this connection it may be usefully mentioned that a single pair of driving pins set diametrically of the wheel (see Fig. 2) serves well.

In an actual embodiment of such a pin drive which has been found to give good results, the driving pins are each characterized by a base outward conical head portion and a parallel shank portion, the latter being screw-threaded adjacent to the free end and having a shouldered down end adapted to take a locking pin after the nut *k* has been screwed home. Correspondingly the walls of the holes when alined in the sleeve flange and the wheel conform to end-on truncated-cone and cylindrical surfaces, the conical surface reaching slightly or somewhat into the wheel, and feathers being provided on the conical heads of the driving pins *j* to engage with featherways in the walls of the holes.

Conveniently and advantageously the walls of the holes in the wheel are formed by a flange *l* at or adjacent to the inside of the hub and side bosses *m* rising outwardly from the flange *l*, the outer plate *n* of the wheel being perforated for the passage of the outer parts of the driving pins and their nuts *k* and for the application of a box spanner to the nuts *k*. Also the adjacent ends of the sleeve *b* and the wheel hub *a* are formed as depicted so as to inter-engage in the spigot and faucet fashion.

Appropriate provision is made for preventing over tensioning of the driving pins when tightening the nuts, suitable means for this purpose being the interposition of spring washers *o* of appropriate strength under the nuts.

Provision for connecting the wheels for drive of rotation and for disconnecting the wheels substantially as hereinabove described makes it possible to arrange each of the hind wheels of a steam-wagon or the like for simple free sliding on and off of the corresponding end of the axle for repairs, interchanging and other purposes. At the same time it becomes possible to locate the connection to the keyed sleeve *b* or the compensating gear sleeve *d* substantially within the clearance or overhang of the wheel felly and tread, see Fig. 1. Hence space exigencies are notably allowed for.

The further and great advantage is gained by the connecting provision hereinabove set forth that thereby the legal requirements for a quick acting braking on both hind wheels equally and simultaneously can be complied with and this in a way that allows of control by a simple working of a hand-lever, alternatively and by preference a foot lever, also that has no subversive effect whatsoever upon the dismounting facilities of the drive.

Doing this, while retaining all the dismounting facilities is an important aspect of the present invention.

Further this braking provision is possible and is by preference made in such wise that so far as the braking arrangement directly appertains to the wheel as adjuncts thereto and space occupying extensions thereof, it becomes located substantially within the clearance or overhang of the wheel felly and tread. This notwithstanding, there may be cases where, as in the case of a near side wheel of a steam or like wagon, it is possible to bring the wheel braking adjuncts completely outside of the wheel, and in such a case a variation or alteration of this character is to be regarded as forming part of the present specification.

In providing the braking provision according to the best embodiment at present known to us, each sleeve flange *g* is arranged as a disk or equivalent to carry a braking drum *p* which may be formed integral with the disk *g* or otherwise made fast thereto, for example as shown in Fig. 3 by the side rim *q*, radial lugs *r* and screw nutted bolts *s*. These drums *p* are provided with uprising rims in the usual way and external band or strap brakes of an approved pattern are fitted thereto and connected for equal and simultaneous actuation in some suitable manner to a single lever as *t*, Fig. 4, on the foot board, this lever being preferably a foot lever as shown.

A convenient connection of the operating foot lever *t* to the braking bands or straps *u*, is one as shown in side elevation in Fig. 4 comprising a cross-shaft with conventional lever connections. Fig. 4 also figures in dotted outline how a second foot lever *t'* may be embodied for a driver's mate to apply the brakes should the driver be prevented from doing so. Provision is made, as a toothed rack, (not shown) for optionally locking the pedals in braking position.

The wheel axle *c* generally at each end but particularly at that end corresponding to the wheel connected to the compensating gear sleeve *d* is extended beyond the wheel hub and shouldered down and perforated to receive a stop-collar *w* and a cross pin *x*, the collar *w* in the above mentioned particular case having a perforated flange *l* by which and a locking pin (not shown) the action of the compensating gear may be temporarily nullified in well known manner as required.

For higher braking efficiency the braking drum on the flange sleeve *b* may be suppressed in favor of a larger and wider braking drum keyed directly to the axle *c* as shown in dotted outline at 2, Fig. 1, the drum disk or spider being given a bias toward the wheel for tank clearance.

What we claim is:—

In apparatus of the class described, in combination, a hub element provided with an outwardly extending member, a wheel provided with a member adjacent said first member, substantially registering openings in said members each of which in each member is shaped with substantially the same taper, tapering connecting members passing through said registering openings and having substantially the same taper with each of the same, and means adapted to tighten said connecting members.

In testimony whereof, we affix our signatures.

SAMUEL COLLAGE STREET.
PERCY WILLIAM SIRETT.